Jan. 24, 1967 W. S. OPPENHEIMER 3,300,146
FUEL OIL JET
Filed Aug. 10, 1964 3 Sheets-Sheet 2
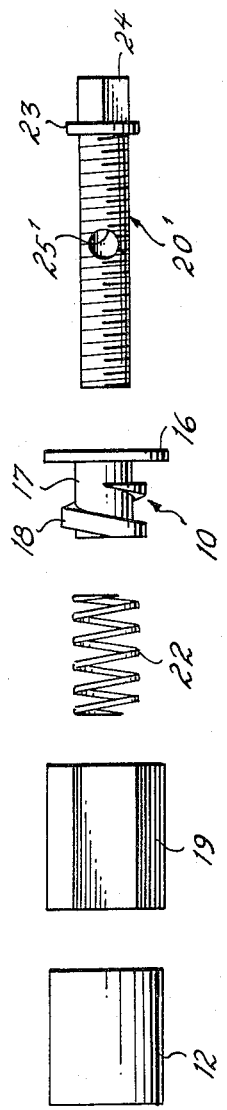
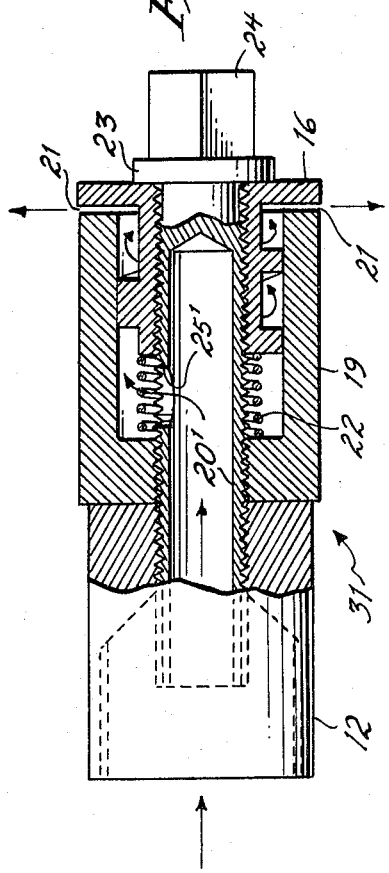
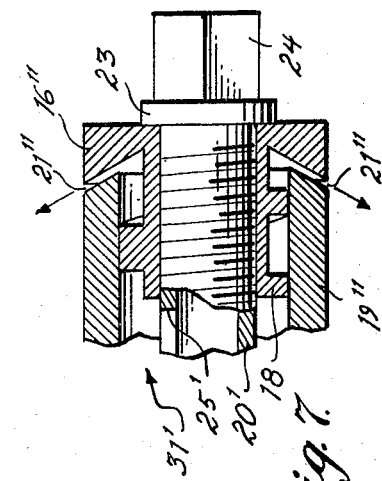
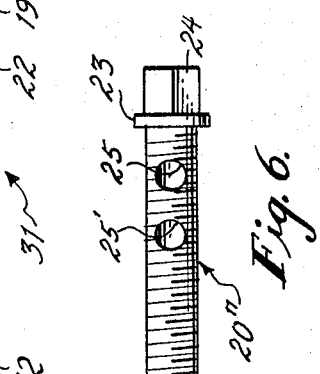
INVENTOR.
WALTER S. OPPENHEIMER
BY
ATTORNEYS.

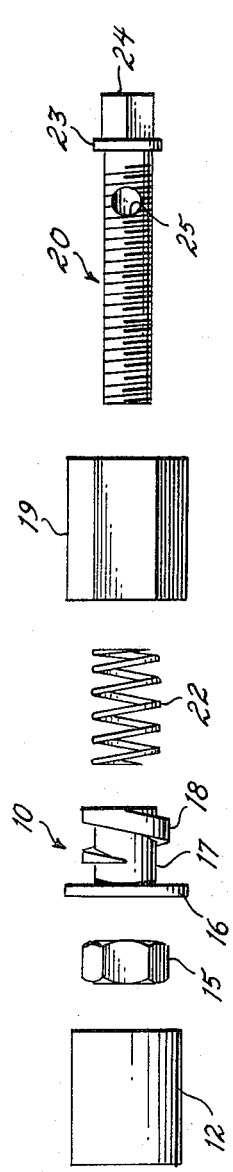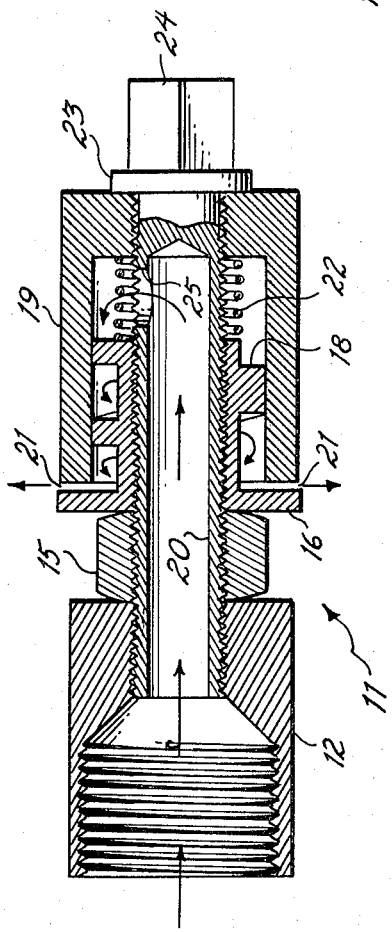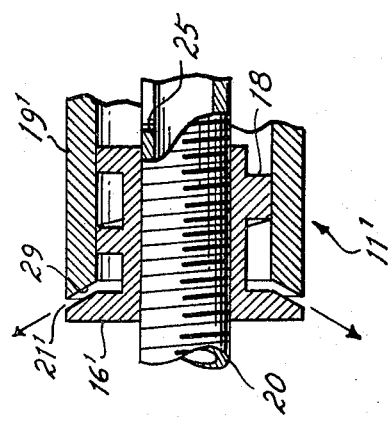

INVENTOR.
WALTER S. OPPENHEIMER
BY McClure & Weiser
ATTORNEYS.

United States Patent Office 3,300,146
Patented Jan. 24, 1967

3,300,146
FUEL OIL JET
Walter S. Oppenheimer, 1445 70th Ave.,
Philadelphia, Pa. 19126
Filed Aug. 10, 1964, Ser. No. 388,607
7 Claims. (Cl. 239—487)

This invention relates to fuel oil combustion apparatus and particularly to a fuel oil jet for use therein.

Fuel oil is often burned in horizontal rotary burners in which a supply line for the fuel oil terminates in a fitting having one or more openings through which the fuel oil is expelled into the interior of a rotary conical or cuplike device that receives the fuel oil and spins it into a combustion zone. The conventional tips, which may or may not properly be termed jets, are inefficient and conducive to incomplete combustion and sooting. Burners of this general type, while adapted for use under substantial pressure, are not to be compared to heavy-duty high-pressure equipment utilizing steam-aided atomization, in which complex jets are known.

A primary object of the present invention is provision of fuel oil jets effective to promote more complete and efficient combustion in relatively simple combustion apparatus, such as horizontal rotary burners.

Another object of this invention is provision of a multiple-component jet device convertible between forward flow and reverse flow assembly without substitution of components.

A further object of the present invention is provision of a multiple-component jet device convertible further for variation in lateral jetting direction by substitution of components and especially adapted for desired placement of oil spray in a horizontal rotary burner.

Other objects of this invention, together with means and methods for attaining the various objects, will be apparent from the following description and the accompanying diagrams.

FIG. 1 is an exploded side elevational view of a fuel jet of this invention;

FIG. 2 is a side sectional elevation of the same jet assembled; and

FIG. 3 is a fragmentary side sectional elevation of a modification of the jet of the preceding views.

FIG. 4 is an exploded side elevational view of a further modification of fuel jet according to this invention;

FIG. 5 is a side sectional elevation of the jet of FIG. 4 shown assembled;

FIG. 6 is a side elevation of a fuel tube useful as a component of any of the jets shown in further detail in the preceding and succeeding views; and FIG. 7 is a fragmentary side sectional elevation of a modification of the jet of the immediately preceding views.

Figure 8:
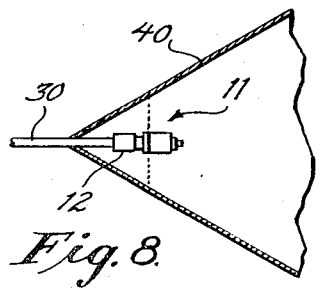
FIG. 8 is a side elevation, partly in section, of fuel oil combustion apparatus including the jet of FIG. 2.
Figure 9:
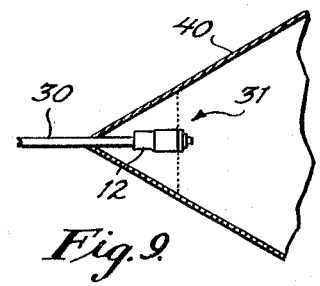
FIG. 9 is a side elevation, partly in section, of fuel oil combustion apparatus including the jet of FIG. 5.

In general, the objects of the present invention are accomplished by means of a fuel oil jet having a housing open at one end, a fuel tube therein open and protruding from one end thereof and closed at the opposite end and communicating between its ends with the interior of the housing, and an end plate juxtaposed to the open end of the housing but spaced therefrom for flow of oil therebetween to the exterior. The invention comprehends fuel oil combustion apparatus including, in addition to a fule line, such a fuel oil jet connected to the fuel line and adapted to spray fuel oil out in a sheet extending throughout a complete circle about the jet axis and perpendicular thereto, and a rotary atomizing cup surrounding the fuel oil jet to intercept the spray of fuel oil therefrom on its inner surface.

FIG. 1 shows, in side elevation, the components of a first embodiment of fuel jet 11 of this invention exploded along a common longitudinal axis, and the same jet is shown, in side sectional elevation, fully assembled in the next view. The arrows superimposed in FIG. 2 show the direction of flow of fuel oil through the jet.

Adapter 12 is threaded internally at two different diameters or thread sizes; the indicated larger end is designed for attachment to a fuel line (not shown) leading from the source, such as a storage tank, of fuel oil, while the smaller end is threaded onto one end of fuel tube 20. Retaining or lock nut 15 is threaded onto the fuel tube between the adapter and abutting an end of the adapter and end plate 16 of member 10 bored to receive the fuel tube. The member includes, affixed to the end plate and extending axially therefrom along the fuel tube on the far side from the nut, internally threaded sleeve 17 carrying spaced external helical threading 18. Housing 19, which has a threaded bore in its otherwise closed far end, is threaded the furthest on the fuel tube to surround the spaced helical thread and leaves narrow circumferential slit 21 between the otherwise open opposite end of the housing and the adjacent surface of end plate 16. Located within the housing and around the fuel tube is helical compression spring 22, which bears at one end against the other end of the housing (about the bore therein) and at the other end against the end of the internally threaded sleeve. External shoulder 23 of the fuel tube abuts the outside of that end of the housing and terminates in square head 24. Opening 25 through the wall of the fuel tube provides communication between the interior of the fuel tube and the interior of the housing at a location past the end of the sleeve, the external threading of which abuts the inside wall of the housing between this location and the open end of the housing, which is covered by the end plate except for circumferential slit 21.

It will be apparent from the assembled view of FIG. 2 particularly, and from the flow arrows shown there, that fuel oil from the fuel line (not shown) enters the large end of the adapter and passes into the small end thereof and into the open end of the fuel tube threaded therein. After passing axially through the fuel tube toward the closed end thereof the oil leaves the tube and enters the housing interior by way of the opening in the wall of the tube, passing through the partially compressed spring. Thence the oil swirls through the helical passageway provided by the threading fitting against the inside wall of the housing and exits at the end through the circumferential slit between the housing end and the end plate, becoming a circumferential sheetlike spray of oil perpendicular to the common axis. The width of the slit is adjusted, by threading the member carrying the end plate and sleeve with the helical threading further or less far onto the fuel tube, for the desired degree of fineness or atomization of the spray of oil, dependent upon the oil viscosity and other physical characteristics and the supply pressure. Upon proper adjustment, which can be checked visually, the oil will be found to be wholly or largely in the form of relatively small droplets conducive to good combustion. Of course, the jet may be used within rotary combustion apparatus designed to atomize the oil further.

FIG. 3 shows, in fragmentary side sectional elevation, modification 11' of the fuel oil jet just described. Like parts are numbered identically, and modified parts are numbered similarly using primes to indicate the presence of some modification. The only modified parts are housing 19', which has a conical internal taper 29 at its open end, and end plate 16', which has its adjacent face chamfered parallel to the taper of the housing end. These modifications result in circumferential slit 21', which is directed outward toward the entering end instead of perpendicular to the axis as in the first embodiment. Spring 22 is omitted from this view in the interest of clarity. In fact, the spring can be omitted from the assembled jet itself, whether in the embodiment of this view or other views, as when very high-viscosity (e.g., No. 6) oil is being used, in which event the retaining or lock nut (15, shown previously) is relied upon to maintain the end plate the proper distance from the end of the housing; alternatively, the nut can be omitted and the spring alone be relied upon to perform this function in any of the embodiments described or shown here.

FIG. 4 shows in exploded side elevation the components, and FIG. 5 in side sectional elevation the assembly, of fuel oil jet 31, which differs from the first embodiment (11) only in modification of the fuel tube, in elimination of the retaining or lock nut (15), and in the order and orientation of assembly. As with the last described embodiment, like parts are numbered identically, and modified parts are indicated by priming of reference numerals. Comparison with the preceding views will show that housing 19 and cooperating member 10 are reversed end for end and interchanged and are assembled with the order and orientation of the other components unchanged, on modified fuel tube 20' (which differs only in having opening 25' therein being substituted for opening 25, which was located nearer the head end). Thus, the fuel oil entering the adapter and then the fuel tube does not reverse its direction of flow upon passing through the opening into the helical passageway to the circumferential exit slit. The spray of oil is like that provided by the first jet embodiment, but it is located nearer the closed head end of the fuel tube. Omission of the retaining or lock nut from this embodiment is desirable so as to avoid placing the oil spray too far from the end of the fuel line (not shown) on which the adapter fits.

FIG. 6 shows in side elevation modified fuel tube 20'', which has in it both opening 25 as in the first embodiment and opening 25' as in the last embodiment. It may be used as a substitute for fuel tubes 20 and 20', the unused opening being closed by sleeve 17, whereupon either jet embodiment may be assembled from the same group of elements (with or without nut 15, as desired).

FIG. 7 shows, in fragmentary side elevation, further modified fuel jet 31', which differs from that of FIG. 5 by having end plate 16'' angled back to provide an internal conical taper on the face against which the oil impinges. The adjacent end of the housing is chamfered to provide slit 21'' between the two adjacent surfaces. The slit slants back toward the entering end much as did slit 21' in the embodiment shown in FIG. 3, although the angles on the edges of the slit-defining elements are reversed because the elements themselves are reversed in orientation in FIG. 7.

Figure 10:
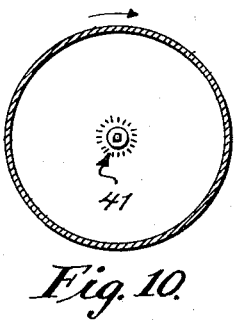
FIG. 10 is an end elevation, partly in section of fuel oil combustion apparatus including such a jet.
Figure 11:
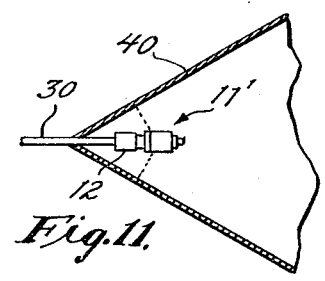
FIG. 11 is a side elevation, partly in section, of fuel oil combustion apparatus including the jet of FIG. 3.
Figure 12:
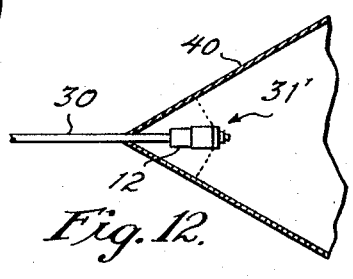
FIG. 12 is a side elevation, partly in section, of fuel oil combustion apparatus including the jet of FIG. 7.

FIGS. 8, 9, 11, and 12 show, in end elevation (partly in section) the fuel oil jets of FIGS. 2, 5, 3, and 7, respectively, each within a conical cuplike element concentric therewith and adapted to rotate about the common axis. Some such element, often called an "atomizing cup," which may take any of many varied configurations is a common feature of fuel oil combustion apparatus, such as horizontal rotary burners, for example. The cup, designated here as 40, has fuel line 30 entering through the apex and has the jet affixed to the end thereof by means of adapter 12. The sheetlike spray of oil from the jet is denoted by a pair of dotted lines; in FIGS. 8 and 9 the oil sprays out from the jet at a right angle to the axis and impinges at an acute angle upon the inside surface of the cup. In FIGS. 11 and 12 the oil spray is oriented at an acute angle (approximately 60°) back toward the fuel line to the source and impinges nearly perpendicularly on the inside surface of the cup nearer the apex of the cone, as is often desirable to improve atomization. FIG. 10 shows, in end elevation (also partly in section) the rotating cup with one of the jets therein, here denoted as 41 (to be any of the four). Short broken lines radiating from the jet denote the spray of fuel oil emerging therefrom; it will be understood that the spray extends to the wall of the conical cup, but the showing is simplified for clarity.

Figure 14:
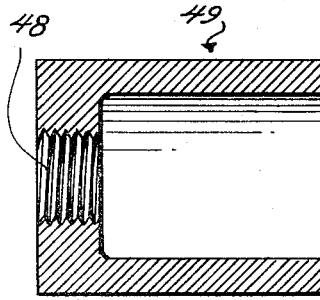
FIG. 14 is a side sectional elevation of the last jet, taken at XIV—XIV on FIG. 13.
Figure 13:
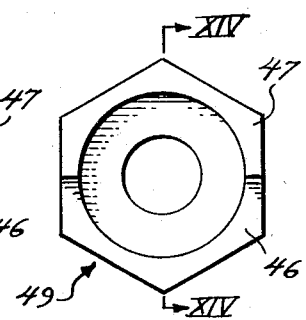
FIG. 13 is an end elevation of a housing useful as a component of a further modification of fuel oil jet according to this invention.
Figure 15:
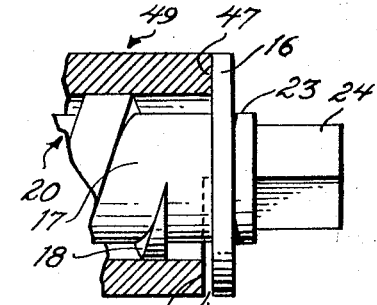
FIG. 15 is a fragmentary side sectional elevation of the same jet assembled.

FIG. 13 shows in end elevation modified housing 49, which is like the housing shown in FIGS. 1, 2, 4, and 5 except that half of the wall at the open end is relieved or undercut uniformly, leaving one half projecting slightly farther than the other, as is shown more clearly in the side sectional elevation of FIG. 14. When this housing has fuel tube 20 threaded into bore 48 in the opposite end of the housing to place overhanging end portion 47 against end plate 16, semicircular or half-circumferential slit 61 is formed between the end plate and relieved or undercut end portion 46 of the housing. Resulting fuel jet 51 sprays oil in the same fashion as that shown in FIG. 5, for example, but only from 180° about its peripheral surface. Such a jet may be mounted like the jets shown in FIGS. 8 through 12; alternatively, however, it may be mounted in a vertical position within a rotary cup having a similar horizontal axis, as is shown in the succeeding views. Details of the rotary cup and the drive therefor and related elements, such as vanes for furnishing of air to the combustion zone which itself is normally located outside but near the wide end thereof, are omitted as superfluous, from this view as from the previous views.

Figure 16:
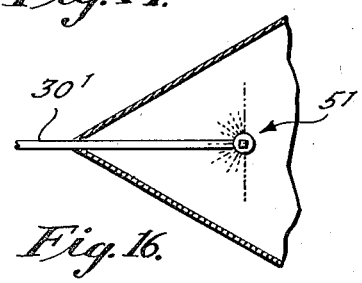
FIG. 16 is a top plan, partly in section, of fuel oil combustion apparatus including the jet of the last several views.
Figure 18:
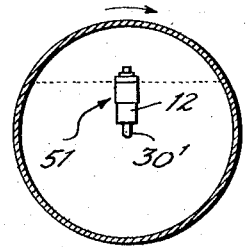
FIG. 18 is an end elevation, partly in section of the same apparatus.
Figure 17:
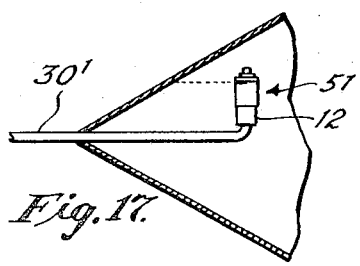
FIG. 17 is a side elevation, partly in section of the apparatus of the last preceding view.

FIGS. 16, 17, and 18 show in plan, side elevation, and end elevation respectively, fuel jet 51 vertically mounted within conical atomizing cup 40 having a horizontal axis. Fuel line 30' terminates in an upturned end or street L threaded into adapter 12. The jet housing is oriented so that the spray of fuel oil is directed in a rearward half circle to impinge upon the inside wall of the rotating cup. It will be apparent that the relieving or undercutting of the end of the housing to form one side of the exit slit may be extended over somewhat more than 180° or may be confined to a smaller angle if desired.

No special material is required for this last or any of the other described or illustrated fuel jets; brass is usually a suitable material, and other metals can be used, depending upon structural and use requirements, size, temperature, etc. While various preferred embodiments and modifications have been suggested, others may be employed, including combination or subdivision of parts and change in size, shape, or manner of retention in assembly, without involving a departure from the invention defined in the following claims and while retaining to a greater or lesser extent the advantages and benefits of this invention, such as simplicity in construction and assembly, and operation, freedom from maintenance and repair, and specifically decreased oil consumption for given heat production and decreased sooting.

The claimed invention is:
1. In a fuel oil jet, a housing open at one end and having a threaded bore at the opposite end, a fuel tube threaded thereinto and extending therethrough, the fuel tube being open and protruding from the open end and being closed and protruding from the opposite end and communicating therebetween with the interior of the housing, an end plate threaded onto the protruding open end of the fuel tube into juxtaposition with the open end of the housing but spaced therefrom for flow of oil therebetween to the exterior, and means threaded onto the open end of the fuel tube to retain the assembly together.

2. In a fuel oil jet, a housing open at one end, the housing having an axial bore therein at the opposite end, a fuel tube fitting in the axial bore and protruding from both ends of the housing, the fuel tube being open at one end thereof and being closed at the opposite end, the fuel tube communicating between its ends with the interior of the housing, and a sleeve having integral therewith an end plate fitting onto one protruding end of the fuel tube in juxtaposition to the open end of the housing but spaced therefrom for flow of oil therebetween to the exterior, the jet being convertible to receive the fuel tube in either direction through the housing, the fuel tube having first and second transverse openings therethrough spaced therealong, the first opening being covered and closed by the sleeve with the second opening providing communication with the interior of the housing when the fuel tube protrudes from the open end, and the second opening being covered and closed by the sleeve with the first opening providing communication with the interior of the housing when the fuel tube protrudes from the closed end of the housing.

3. In fuel oil combustion apparatus, a fuel line, a fuel oil jet according to claim 1 connected to the fuel line and adapted to spray fuel oil out in a sheet extending therefrom, and a tapered rotary atomizing cup surrounding the fuel oil jet to intercept the spray of fuel oil therefrom on its inner surface.

4. In fuel oil combustion apparatus, a fuel line, a fuel oil jet connected to the fuel line and having an open-ended housing and an end plate juxtaposed to but spaced from the open end of the housing for flow of oil to the exterior therebetween and thereby adapted to spray fuel oil out therefrom in a sheet centered about the jet axis, a tapered rotary atomizing cup surrounding the fuel oil jet to intercept on its inner surface some of the fuel oil sprayed therefrom, the axis of rotation of the atomizing cup being substantially perpendicular to the jet axis.

5. In fuel oil combustion apparatus, a fuel line, a fuel oil jet connected to the fuel line and having an open-ended housing and an end plate juxtaposed thereto and contiguous with the housing end through about a semicircle and spaced from the housing end through about a semicircle for flow of oil to the exterior therebetween and thereby adapted to spray fuel oil but therefrom in a sheet centered about the jet axis and extending through about a semicircle therearound, a tapered rotary atomizing cup surrounding the fuel oil jet to intercept on its inner surface essentially all the fuel oil sprayed therefrom, the axis of rotation of the atomizing cup being substantially perpendicular to the jet axis.

6. In a fuel oil jet, a cylindrical housing open at one end and with a bore therein at the opposite end, an externally threaded fuel tube extending therethrough fitting in and thereby closing the bore and protruding from the housing at both ends, the fuel tube being open at one of its ends and being closed and having a head at its opposite end, the fuel tube communicating between its ends with the interior of the housing, an internally threaded sleeve threaded onto the end of the fuel tube protruding from the open end of the housing and carrying an end plate, the end plate being juxtaposed to the open end of the housing but spaced adjustably therefrom for flow of oil therebetween to the exterior, and frictional means for retaining the assembly together, and a compression spring surrounding the fuel tube inside the housing and frictionally engaging at one of its ends the inside wall of the housing about the bore and frictionally engaging at the other of its ends the near end of the sleeve to impede relative rotation thereof and thereby maintain the adjusted spacing of the end plate from the open end of the housing.

7. In a fuel oil jet, a cylindrical housing open at one end and with a bore therein at the opposite end, a fuel tube extending therethrough fitting in and thereby closing the bore and protruding from the housing at both ends, the fuel tube being open at one of its ends and being closed and having a head at its opposite end, the fuel tube communicating between its ends with the interior of the housing, an end plate fitting onto the end of the fuel tube protruding from the open end of the housing, the end plate being juxtaposed to the open end of the housing but spaced therefrom for flow of oil therebetween to the exterior, and an adapter fitting onto the protruding open end of the fuel tube for interconnecting the fuel tube to a fuel supply line of different size and retaining the assembly together.

References Cited by the Examiner
UNITED STATES PATENTS

| | | | |
|---|---|---|---|
| 1,223,081 | 4/1917 | Lissauer | 239—487 X |
| 1,327,744 | 1/1920 | Tartrais | 239—489 X |
| 1,648,923 | 11/1927 | Warrick | 158—77 |
| 2,046,592 | 7/1936 | Tracy | 158—73 |
| 2,165,191 | 7/1939 | Kucher | 158—77 |
| 3,021,892 | 2/1962 | Brola | 158—77 |

FREDERICK L. MATTESON, JR., *Primary Examiner.*

E. G. FAVORS, *Assistant Examiner.*